United States Patent
Ito et al.

(10) Patent No.: US 11,428,954 B2
(45) Date of Patent: Aug. 30, 2022

(54) DESIGNING METHOD AND PRODUCING METHOD OF PAIR OF SPECTACLE LENSES, AND PAIR OF SPECTACLE LENSES

(71) Applicant: HOYA LENS THAILAND LTD., Pathumthani (TH)

(72) Inventors: Ayumu Ito, Tokyo (JP); Toshiaki Sonehara, Tokyo (JP); Tadashi Kaga, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 161 days.

(21) Appl. No.: 16/641,788

(22) PCT Filed: Mar. 26, 2019

(86) PCT No.: PCT/JP2019/012706
§ 371 (c)(1),
(2) Date: Mar. 30, 2020

(87) PCT Pub. No.: WO2019/189091
PCT Pub. Date: Oct. 3, 2019

(65) Prior Publication Data
US 2020/0249499 A1    Aug. 6, 2020

(30) Foreign Application Priority Data
Mar. 27, 2018 (JP) .............................. JP2018-059280

(51) Int. Cl.
*G02C 7/02* (2006.01)
*G02C 7/06* (2006.01)

(52) U.S. Cl.
CPC ............. *G02C 7/027* (2013.01); *G02C 7/028* (2013.01); *G02C 7/06* (2013.01)

(58) Field of Classification Search
CPC ........ G02C 7/027; G02C 7/024; G02C 7/028; G02C 7/06; G02C 7/061
(Continued)

(56) References Cited

U.S. PATENT DOCUMENTS 4,923,296 A    5/1990 Erickson
6,318,857 B1 *  11/2001 Shirayanagi ........... G02C 7/085
351/158

(Continued)

FOREIGN PATENT DOCUMENTS

DE          375491 C        9/1923
JP      2011-203705 A      10/2011
(Continued)

OTHER PUBLICATIONS

Jun. 18, 2019 International Search Report issued in International Patent Application No. PCT/JP2019/012706.
(Continued)

*Primary Examiner* — Jordan M Schwartz
(74) *Attorney, Agent, or Firm* — Oliff PLC

(57) ABSTRACT

A designing method of a pair of spectacle lenses, which includes a right-eye spectacle lens and a left-eye spectacle lens, includes a process of designing the pair of spectacle lenses; a power error (unit: diopter (D)) that compensates for a difference between a response of accommodation of a right eye and a response of accommodation of a left eye of a wearer, wherein a response of accommodation (unit: diopter (D)) of each eye is a difference AC (=applied accommodation ACN–applied accommodation ACF) between an applied accommodation ACF of the eye of the wearer exhibited when the wearer views an object at a distance f and an applied accommodation ACN of the eye of the wearer exhibited when viewing an object at a distance n shorter than the distance f.

9 Claims, 4 Drawing Sheets

(58) Field of Classification Search
USPC ............ 351/159.41, 159.42, 159.47, 159.75
See application file for complete search history.

(56) References Cited

U.S. PATENT DOCUMENTS

| | | | |
|---|---|---|---|
| 2004/0190136 A1* | 9/2004 | Kanai | G02B 25/004 |
| | | | 359/554 |
| 2011/0211159 A1 | 9/2011 | Suzuki | |
| 2012/0019775 A1* | 1/2012 | Tyrin | A61H 5/00 |
| | | | 351/203 |
| 2015/0185503 A1* | 7/2015 | Tate | G02C 7/083 |
| | | | 351/158 |
| 2015/0212338 A1* | 7/2015 | Qi | G02C 7/028 |
| | | | 351/159.75 |
| 2016/0004096 A1 | 1/2016 | Kozu | |
| 2017/0299891 A1 | 10/2017 | Odaira et al. | |

FOREIGN PATENT DOCUMENTS

| | | | |
|---|---|---|---|
| JP | 2017-090729 A | 5/2017 | |
| JP | 2017-122941 A | 7/2017 | |
| WO | 2014/128744 A1 | 8/2014 | |
| WO | 2016/047712 A1 | 3/2016 | |

OTHER PUBLICATIONS

Oct. 8, 2020 Translation of International Preliminary Report on Patentability issued in International Patent Application No. PCT/JP2019/012706.
Nov. 30, 2021 extended Search Report issued in European Patent Application No. 19775162.1.

\* cited by examiner

EXAMPLE 1 (RIGHT-EYE SPECTACLE LENS)

EXAMPLE 1 (LEFT-EYE SPECTACLE LENS)

EXAMPLE 2 (RIGHT-EYE SPECTACLE LENS)

EXAMPLE 2 (LEFT-EYE SPECTACLE LENS)

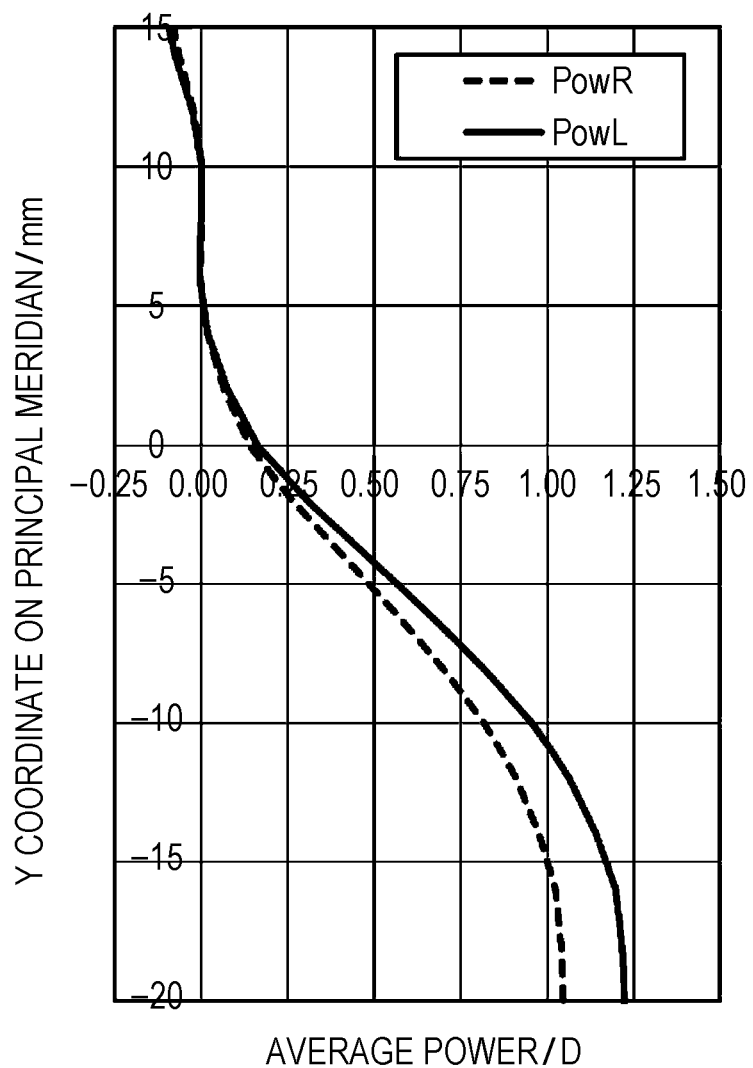

DESIGNING METHOD AND PRODUCING METHOD OF PAIR OF SPECTACLE LENSES, AND PAIR OF SPECTACLE LENSES

TECHNICAL FIELD

The present invention relates to a designing method and a producing method of a pair of spectacle lenses, and a pair of spectacle lenses.

BACKGROUND ART

A human eye has a function called accommodation, which changes a thickness of a crystalline lens to view an object at a predetermined distance. There is disclosed a technique of designing a spectacle lens while taking into account the accommodation ability of a wearer (for example, Patent Literature 1).

CITATION LIST

Patent Literature

Patent Literature 1: WO 2016/047712 A

SUMMARY OF INVENTION

Technical Problem

When viewing an object at a predetermined distance, not the entire accommodation ability of the wearer is used in each of the left and right eyes, and the accommodation ability is partially or entirely exerted according to a condition.

The amount of the exhibited accommodation in an unaccommodated state, that is, a response of accommodation may be different between the right eye and the left eye. Meanwhile, conventionally, the respective lenses for left and right eyes (hereinafter, also referred to as a pair of spectacle lenses) have been designed on the assumption that a response of accommodation of the right eye is equal to a response of accommodation of the left eye. With a pair of conventional spectacle lenses, qualities of left and right images differ in binocular vision if the response of accommodation differs between the right eye and the left eye. In particular, such a tendency becomes remarkable in near vision. In general, it is known that fusion is difficult when the qualities of the left and right images are different.

Therefore, an example of the present invention aims to provide a technique suitable for binocular vision when a wearer uses a pair of spectacle lenses.

Solution to Problem

The present invention has been devised to achieve the above object.

A first aspect of the present invention is a designing method of a pair of spectacle lenses including a right-eye spectacle lens and a left-eye spectacle lens, the designing method including a process of designing the pair of spectacle lenses so as to provide a power difference (unit: diopter (D)) that compensates for a difference between a response of accommodation of a right eye and a response of accommodation of a left eye of a wearer, wherein a response of accommodation (unit: diopter (D)) of each eye is a difference AC (=applied accommodation $AC_N$–applied accommodation $AC_F$) between an applied accommodation $AC_F$ of the eye of the wearer exhibited when the wearer views an object at a distance f and an applied accommodation $AC_N$ of the eye of the wearer exhibited when viewing an object at a distance n shorter than the distance f.

A second aspect of the present invention is an aspect according to the first aspect, wherein, in the designing process, a spectacle lens for an eye with a smaller response of accommodation between the response of accommodation of the right eye and the response of accommodation of the left eye is provided with a larger power difference than a spectacle lens for an eye with a larger response of accommodation, the power difference different from a prescription value.

A third aspect of the present invention is an aspect according to the first or second aspect, wherein, in the designing process, the pair of spectacle lenses is designed by setting a difference between a power error at a position of a predetermined rotation angle on the right-eye spectacle lens and a power error at a position of the predetermined rotation angle on the left-eye spectacle lens based on the difference between the response of accommodation of the right eye and the response of accommodation of the left eye of the wearer.

A fourth aspect of the present invention is an aspect according to the third aspect, wherein, in the designing process, the pair of spectacle lenses is designed so as to set a difference between a power error at a position of a predetermined rotation angle on the right-eye spectacle lens and a power error at a position of the predetermined rotation angle on the left-eye spectacle lens to be approximate to the difference between the response of accommodation of the right eye and the response of accommodation of the left eye of the wearer.

A fifth aspect of the present invention is an aspect according to the third or fourth aspect, wherein, in the designing process, a difference $\Delta PE$ (where $\Delta PE > 0$) between the power error $PE_R$ of the right-eye spectacle lens and the power error $PE_L$ of the left-eye spectacle lens is 80% to 120% of the difference $\Delta AC$ (where $\Delta AC > 0$) between the response of accommodation $AC_R$ of the right eye and the response of accommodation $AC_L$ of the left eye.

A sixth aspect of the present invention is an aspect according to any one of the third to fifth aspects, wherein, in the designing process, the difference $\Delta PE$ (where $\Delta PE > 0$) between the power error $PE_R$ of the right-eye spectacle lens and the power error $PE_L$ of the left-eye spectacle lens is within ±0.25 D with respect to the difference $\Delta AC$ (where $\Delta AC > 0$) between the response of accommodation $AC_R$ of the right eye and the response of accommodation $AC_L$ of the left eye.

A seventh aspect of the present invention is an aspect according to any one of the third to sixth aspects, wherein, in the designing process, a value, obtained by subtracting a power error at a position T2 having a rotation angle α in a spectacle lens for an eye with a larger response of accommodation from a power error at a position T1 of the rotation angle α (15 degrees ≤ α ≤ 40 degrees) in a spectacle lens for an eye with a smaller response of accommodation, is set to be 0.15 D or more.

An eighth aspect of the present invention is an aspect according to the seventh aspect, wherein, in the designing process, the power error at the position T2 in the spectacle lens for the eye with the larger response of accommodation is set within ±0.10 D, and the power error at the position T1 in the spectacle lens for the eye with the smaller response of accommodation is set to be 0.15 D or more.

A ninth aspect of the present invention is an aspect according to any one of the third to eighth aspects, wherein the response of accommodation of the right eye and the response of accommodation of the left eye of the wearer are actually measured values obtained as results of performing measurement on each eye of the wearer to obtain (applied accommodation $AC_N$–applied accommodation $AC_F$).

A tenth aspect of the present invention is an aspect according to any one of the third to ninth aspects, wherein the designing process includes:

a base curve selection process of selecting a base curve according to a prescription in the spectacle lenses for the respective eyes;

an aspherical surface designing process of performing aspherical surface design on a surface on a side of the selected base curve; and a determination process of determining whether or not a value, obtained by subtracting the power error at the position T2 of the rotation angle α in the spectacle lens for the eye with the larger response of accommodation from the power error at the position T1 of the rotation angle α (15 degrees≤α≤40 degrees) in the spectacle lens for the eye with the smaller response of accommodation between the response of accommodation of the right eye and the response of accommodation of the left eye of the wearer, falls within a range of 80% to 120% of the difference ΔAC (where ΔAC>0) between the response of accommodation $AC_R$ of the right eye and the response of accommodation $AC_L$ of the left eye, in a design of the pair of spectacle lenses obtained based on the aspherical surface designing process, and when it is determined in the determination process that the value is not within the range, the determination process is performed again after changing a base curve selected in the base curve selection process and then changing an aspherical surface design in the aspherical surface designing process, or after changing an aspherical surface design in the aspherical surface designing process.

An eleventh aspect of the present invention is a producing method of a pair of spectacle lenses including a right-eye spectacle lens and a left-eye spectacle lens, the producing method including:

a designing process of designing the pair of spectacle lenses using the designing method of a pair of spectacle lens according to any one of the first to tenth aspects; and a producing process of producing the pair of spectacle lenses based on a content designed in the designing process.

A twelfth aspect of the present invention is a pair of spectacle lenses including a right-eye spectacle lens and a left-eye spectacle lens, both the spectacle lenses being single-focus lenses, wherein a difference between a power error (unit: diopter (D)) at a position T1 of a rotation angle α (15 degrees≤α≤40 degrees) in a first spectacle lens and a power error at a position T2 of the rotation angle α in a second spectacle lens is 0.15 D or more.

A thirteenth aspect of the present invention is an aspect according to the twelfth aspect, wherein a power error at the position T2 in the first spectacle lens is within ±0.10 D, and a power error at the position T1 in the second spectacle lens is 0.15 D or more.

A fourteenth aspect of the present invention is a pair of spectacle lenses comprising a right-eye spectacle lens and a left-eye spectacle lens, both the spectacle lenses being progressive addition lenses, wherein a difference between a power difference (unit: diopter (D)) different from a prescription value at a near power measurement position T1 in a first spectacle lens, and a power difference different from a prescription value at a near power measurement position T2 in a second spectacle lens, is 0.15 D or more.

A fifteenth aspect of the present invention is an aspect according to the fourteenth aspect, wherein it is preferable that a power difference different from a prescription value at the position T2 in the first spectacle lens be within ±0.10 D, and a power difference different from a prescription value at the position T1 in the second spectacle lens be 0.15 D or more.

Hereinafter, other aspects of the present invention will be described. For example, the twelfth to fifteenth aspects are also characterized as a designing method and a producing method of a spectacle lens. In addition, the above-described respective aspects may be appropriately combined with the following aspects.

According to another aspect of the invention, in the designing process, a positive power error is provided to a spectacle lens for an eye with a smaller response of accommodation between the response of accommodation $AC_R$ of the right eye and the response of accommodation $AC_L$ of the left eye.

According to another aspect of the invention, in the designing process, a difference ΔPE (where ΔPE>0) between the power error $PE_R$ of the right-eye spectacle lens and the power error $PE_L$ of the left-eye spectacle lens is 90% to 110% of the difference ΔAC (where ΔAC>0) between the response of accommodation $AC_R$ of the right eye and the response of accommodation $AC_L$ of the left eye.

According to another aspect of the invention, in the designing process, a difference ΔPE (where ΔPE>0) between the power error $PE_R$ of the right-eye spectacle lens and the power error $PE_L$ of the left-eye spectacle lens is 95% to 105% of the difference ΔAC (where ΔAC>0) between the response of accommodation $AC_R$ of the right eye and the response of accommodation $AC_L$ of the left eye.

According to another aspect of the present invention, the power error in the designing process is a value at a position of a rotation angle α (20 degrees≤α≤35 degrees).

According to another aspect of the present invention, the power error in the designing process is a value at a position of a rotation angle α of 30 degrees.

According to another aspect of the invention, provided are:

a process of acquiring a prescription value of a wearer; a process of acquiring a target distance for near vision when the wearer wears a spectacle lens; and a process of acquiring the responses of accommodation ($AC_R$ and $AC_L$) of the respective eyes.

According to another aspect of the invention, the power difference provided in the designing process is obtained from an aspherical surface design of a single-focus lens.

According to another aspect of the invention, the power difference provided in the designing process is obtained by setting an addition power of a progressive addition lens.

Note that, when both the pair of spectacle lenses are progressive addition lenses, the position T1 and the position T2 may be set as near power measurement positions, and the power error may be calculated as a value obtained by subtracting a power at a distance power measurement position from a power at the near power measurement position. Then, each of the above-described suitable examples may be applied to the case of the pair of progressive addition lenses.

According to another aspect of the invention, provided is a pair of spectacle lenses including a right-eye spectacle lens and a left-eye spectacle lens, wherein a difference is 0.15 D or more, the difference between a power difference (unit: diopter (D)) at a position T1 of a rotation angle α (15 degrees≤α≤40 degrees) in a first spectacle lens, the power difference different from a prescription value, and a power difference at a position T2 of the rotation angle α in a second spectacle lens, the power difference different from a prescription value.

According to another aspect of the invention, a difference is 0.50 D or less and preferably 0.25 D or less, the difference between a power difference (unit: diopter (D)) different from a prescription value at a near power measurement position T1 in a first spectacle lens and a power difference different from a prescription value at a near power measurement position T2 in the second spectacle lens.

According to another aspect of the invention, a power error at the position T1 in the second spectacle lens is 0.50 D or less, and preferably 0.25 D or less.

Advantageous Effects of Invention

According to one embodiment of the present invention, it is possible to provide a technique suitable for binocular vision when a wearer uses a pair of spectacle lenses.

BRIEF DESCRIPTION OF DRAWINGS

FIG. 6 is a graph showing a power change in a right-eye spectacle lens (broken line) and a left-eye spectacle lens (solid line) in Example 3, in which the horizontal axis represents D (1 scale is 0.25 D), and the vertical axis represents a Y coordinate on the principal meridian (1 scale is 5 mm).

DESCRIPTION OF EMBODIMENTS

Figure 1:
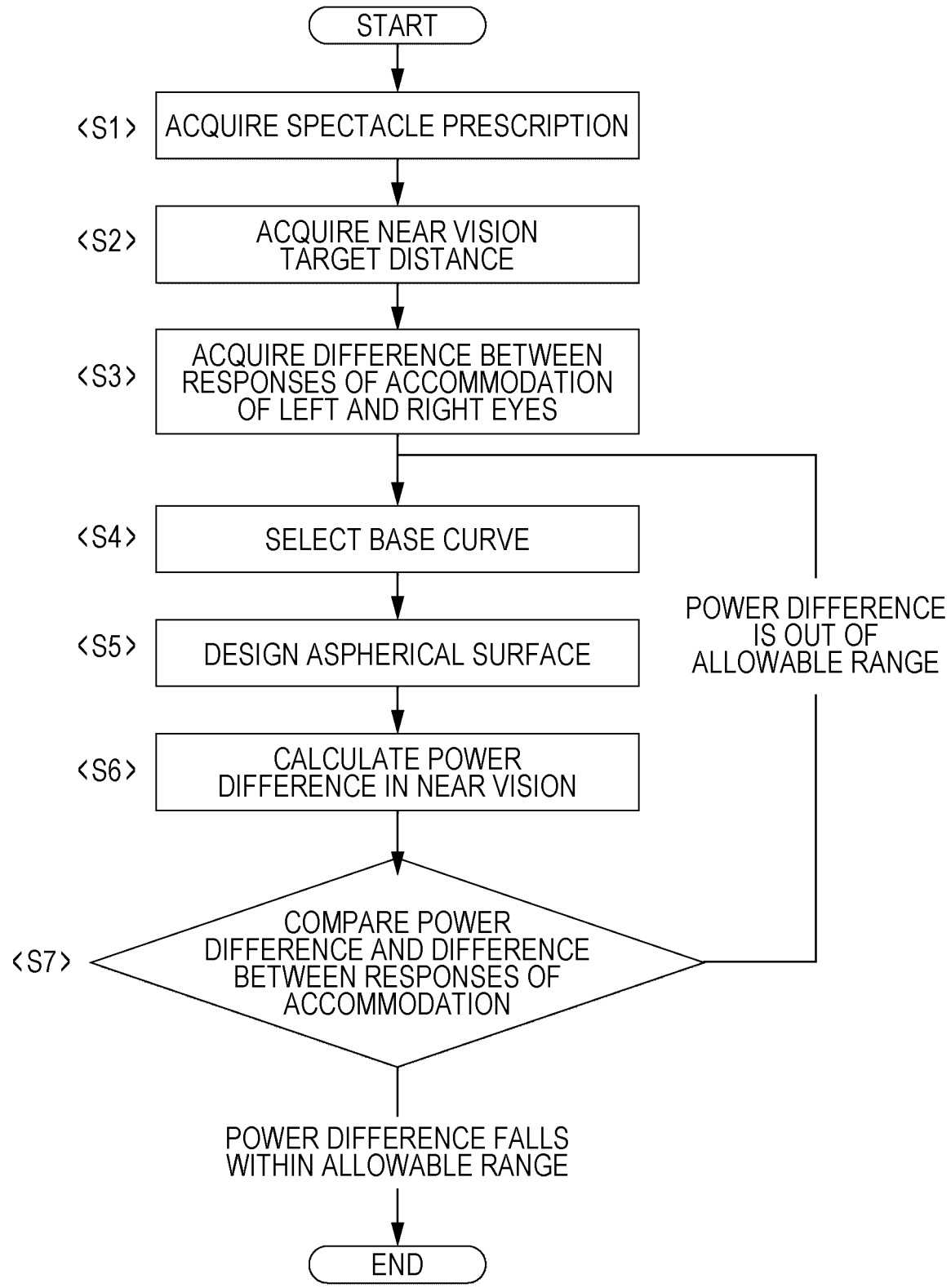
FIG. 1 is a flowchart of a designing method of a pair of spectacle lenses in the case of providing each process according to the present embodiment.

In the present specification, a numerical value without a minus sign indicates a positive numerical value.

(Explanation of Terms)

Hereinafter, the terms used in the present specification will be explained. A point in the outside world that forms an image at the fovea centralis in an unaccommodated state is referred to as a far point of accommodation. Conversely, a point that forms an image at the fovea centralis in a state where an eye is maximally accommodated is referred to as a near point of accommodation.

Then, an accommodation ability of an eye that a range from the far point of accommodation to the near point of accommodation is expressed by diopter (D=1/distance) is referred to an amplitude of accommodation.

When making a subject clearly see a near indicator at a predetermined distance from a far indicator at a predetermined distance, the amount of accommodation that needs to be changed for an eye of the subject, that is, a difference between a required accommodation amount for distance vision and a required accommodation amount for near vision is referred to as a stimulus of accommodation (unit: D). The stimulus of accommodation needs to be set so as not to exceed the amplitude of accommodation.

Note that the eye of the subject is not always actually accommodated for all stimuli of accommodation. For the stimulus of accommodation, a difference between the amount actually accommodated by the eye of the subject, that is, an applied accommodation during distance vision with respect to a predetermined distance, and an applied accommodation during near vision with respect to a distance closer than that in the distance vision is referred to as a response of accommodation (unit: D). The required accommodation amount expresses a distance from a presented visual target to an eye to be examined in diopters. The applied accommodation is the amount actually accommodated by the eye to be examined with respect to the required accommodation amount.

(Concept of Designing Method According to One Embodiment of Present Invention)

"A designing method of a pair of spectacle lenses including a right-eye spectacle lens and a left-eye spectacle lens, the designing method of a pair of spectacle lenses including a designing process of designing a pair of spectacle lenses so as to provide a power difference that compensates for a difference between a response of accommodation of a right eye and a response of accommodation of a left eye of a wearer of the spectacle lenses (hereinafter, also simply referred to as the wearer).

In the present embodiment, a power difference to be corrected is a difference between a response of accommodation $AC_L$ of a left eye and a response of accommodation $AC_R$ of a right eye.

In other words, the response of accommodation of the right eye is a difference $AC_R$ between an applied accommodation $AC_{FR}$ of the right eye of the wearer exhibited when the wearer views an object at a distance f and an applied accommodation $AC_{NR}$ of the right eye of the wearer exhibited when viewing an object at a distance n shorter than the distance f.

In addition, the response of accommodation of the left eye is a difference $AC_L$ between an applied accommodation $AC_{FL}$ of the left eye of the wearer exhibited when the wearer views the object at the distance f and an applied accommodation $AC_{NL}$ of the left eye of the wearer exhibited when viewing the object at the distance n shorter than the distance f.

Further, the present embodiment is characterized mainly by compensating the difference $\Delta AC$ between $AC_R$ and $AC_L$, that is, the difference between the responses of accommodation of the left and right eyes with a difference $\Delta PE$ between a power error $PE_R$ (unit: D) of the right-eye spectacle lens and a power error $PE_L$ (unit: D) of the left-eye spectacle lens.

This term "compensate" means to set the power error $PE_L$ of the left-eye spectacle lens to be larger than the power error $PE_R$ of the right-eye spectacle lens, for example, when the response of accommodation $AC_L$ of the left eye is smaller than the response of accommodation $AC_R$ of the right eye. In the present specification, calculation ($AC_R$–$AC_L$ in the above example) is performed such that $\Delta AC$ becomes positive. Further, in the present specification, calculation ($PE_L$–$PE_R$ in the above example) is performed such that the difference $\Delta PE$ between the power error of the left-eye spectacle lens and the power error of the right-eye spectacle lens becomes positive. This difference $\Delta PE$ in power error corresponds to the power difference that compensates for the difference between the response of accommodation of the right eye and the response of accommodation of the left eye of the wearer.

In addition, the power error PE is a difference between an average power, which is an average of a power in a meridional direction at a predetermined position on a spectacle lens (a position corresponding to a rotation angle α of an eyeball of the wearer) and a power in a sagittal direction, and a vertex power at a lens center (rotation angle of 0°). Note that an astigmatism is a difference between the power in the meridional direction and the power in the sagittal direction.

According to the above configuration, a pair of spectacle lenses suitable for binocular vision can be provided even when the response of accommodation differs between the left eye and the right eye. The reason is as follows. A quality of an image perceived by light incident on the left eye and a quality of an image perceived by light incident on the right eye differ due in part to the difference between the responses of accommodation of the left and right eyes. However, the difference between the responses of accommodation of the left and right eyes is compensated for by using the pair of spectacle lenses of the present embodiment, and the qualities of the images of the left and right eyes are improved so as to match.

In the designing process, it is preferable to provide a positive power error to a spectacle lens for an eye with a smaller response of accommodation between the response of accommodation $AC_R$ of the right eye and the response of accommodation $AC_L$ of the left eye. According to this configuration, it is possible to set a power error of a spectacle lens for an eye with a larger response of accommodation to be substantially zero. Then, the positive power error may be provided to the spectacle lens for the eye with the smaller response of accommodation.

However, it is not inhibited to provide a negative power error to the spectacle lens for the eye with the larger response of accommodation and set the power error of the spectacle lens for the eye with the smaller response of accommodation to be substantially zero. In addition, it is not inhibited to provide a certain degree of negative power error to the spectacle lens for the eye with the larger response of accommodation and provide a certain degree of positive power error to the spectacle lens for the eye with the smaller response of accommodation. Even in these cases, there is no change in providing the power error $\Delta PE$ that compensates for the difference $\Delta AC$ between the response of accommodation $AC_R$ of the right eye and the response of accommodation $AC_L$ of the left eye of the wearer in the pair of spectacle lenses. As a result, the quality of the image can be improved even when the response of accommodation differs between the left eye and the right eye.

The designing process preferably designs the pair of spectacle lenses by setting the difference $\Delta PE$ between the power error $PE_R$ at a position having a predetermined rotation angle on the right-eye spectacle lens and the power error $PE_L$ at a position having the predetermined rotation angle on the left-eye spectacle lens based on the difference $\Delta AC$ between the response of accommodation $AC_R$ of the right eye and the response of accommodation $AC_L$ of the left eye of the wearer. With this configuration, the difference $\Delta AC$ between the responses of accommodation of the left and right eyes is accurately compensated for, and the qualities of the images of the left and right eyes is improved so as to match.

In addition, the designing process preferably designs the pair of spectacle lenses so as to set the difference $\Delta PE$ between the power error $PE_R$ at a position having a predetermined rotation angle on the right-eye spectacle lens and the power error $PE_L$ at a position having the predetermined rotation angle on the left-eye spectacle lens to be approximate to the difference $\Delta AC$ between the response of accommodation $AC_R$ of the right eye and the response of accommodation $AC_L$ of the left eye of the wearer. With this configuration, the difference $\Delta AC$ between the responses of accommodation of the left and right eyes is more accurately compensated for, and the qualities of the images of the left and right eyes is improved so as to match.

In the designing process, the difference $\Delta PE$ (in this case, $\Delta PE>0$) between the power error $PE_R$ of the right-eye spectacle lens and the power error $PE_L$ of the left-eye spectacle lens is preferably 80% to 120% of the difference (in this case, $\Delta AC>0$) between the response of accommodation $AC_R$ of the right eye and the response of accommodation $AC_L$ of the left eye. Within this range, the quality of the image can be more suitably improved even when the response of accommodation differs between the left eye and the right eye. Note that the range is more preferably 90% to 110%, and extremely preferably 95% to 105%.

In addition, the $\Delta PE$ provided in the designing process has a tolerance preferably within ±0.25 D with respect to $\Delta AC$, more preferably ±0.15 D, and even more preferably ±0.12 D.

In the designing process, it is preferable to set a value, obtained by subtracting a power error at a position T2 having a rotation angle α in a spectacle lens for an eye with a larger response of accommodation from a power error at a position T1 of the rotation angle α (for example, 15 degrees≤α≤40 degrees) in a spectacle lens for an eye with a smaller response of accommodation, to be 0.15 D or more. Within this range, the quality of the image can be more suitably improved even when the response of accommodation differs between the right eye and the left eye. An upper limit of the value is not particularly limited. However, it is generally preferable that the power error itself be small. Therefore, the value is set to preferably 0.50 D or less, and more preferably 0.25 D or less.

Note that the corresponding positional relationships match typically if the power is the same at the position T1 of the rotation angle α in the spectacle lens for the eye with the smaller response of accommodation and the position T2 of the rotation angle α in the spectacle lens for the eye with the larger response of accommodation/

In addition, α=20 degrees or 30 degrees is set in the present embodiment for the power difference provided in the designing process, but a value at a position of 20 degrees≤α≤35 degrees may be used, and the invention is not limited thereto.

In the designing process, the power error at the position T2 in the spectacle lens for the eye with the larger response of accommodation may be set within ±0.10 D, and the power error at the position T1 in the spectacle lens for the eye with the smaller response of accommodation may be set to be 0.15 D or more. Note that it is generally preferable that the power error itself be small. Therefore, the power error at the position T1 is set to preferably 0.50 D or less, and more preferably 0.25 D or less.

Design Procedure of Embodiment of Present Invention

FIG. 1 is a flowchart of the designing method of a pair of spectacle lenses in the case of providing each process according to the present embodiment.

<S1> is a process of acquiring a prescription value of the wearer.

<S2> performed subsequently is a process of acquiring a target distance for near vision when the wearer wears the spectacle lenses.

<S3> performed subsequently is a process of acquiring the responses of accommodation $AC_R$ and $AC_L$ of the respective eyes.

<S4> to <S7> correspond to a designing process. The spectacle lenses are designed based on the information obtained in <S1> to <S3>.

In the designing process, <S4> is a base curve selection process of selecting a base curve according to a prescription in the spectacle lens for each eye.

<S5> is an aspherical surface designing process of performing aspherical surface design according to the selected base curve.

<S6> is a process of calculating the value ΔPE, obtained by subtracting the power error at the position T2 of the rotation angle α in the spectacle lens for the eye with the larger response of accommodation from the power error at the position T1 of the rotation angle α (for example, 15 degrees≤α≤40 degrees) in the spectacle lens for the eye with the smaller response of accommodation between the response of accommodation $AC_R$ of the right eye and the response of accommodation $AC_L$ of the left eye of the wearer for near vision, in the design of the pair of spectacle lenses obtained based on the aspherical surface designing process.

<S7> is a process of determining whether or not ΔPE calculated in <S6> is within the range of 80% to 120% of the difference ΔAC between the response of accommodation of the right eye and the response of accommodation of the left eye. If the power difference is within an allowable range and satisfies a condition, the flow of the designing method of the spectacle lenses is ended. If the power difference is out of the allowable range and does not satisfy the condition, the process is started again from the selection of the base curve in <S4>, and <S5> to <S7> are performed until the power difference finally falls within the allowable range in <S7>.

One specific example of the designing process is described as follows.

The designing process preferably includes:

the base curve selection process <S4> of selecting the base curve according to the prescription in the spectacle lenses for the respective eyes;

the aspherical surface designing process <S5> of performing the aspherical surface design according to the selected base curve; and the determination process <S7> of determining whether or not the value ΔPE, obtained by subtracting the power error at the position T2 of the rotation angle α in the spectacle lens for the eye with the larger response of accommodation from the power error at the position T1 of the rotation angle α (15 degrees≤α≤40 degrees) in the spectacle lens for the eye with the smaller response of accommodation between the response of accommodation $AC_R$ of the right eye and the response of accommodation $AC_L$ of the left eye of the wearer, falls within the range of 80% to 120% of the difference ΔAC between the response of accommodation of the right eye and the response of accommodation of the left eye in the design of the pair of spectacle lenses obtained based on the aspherical surface designing process.

Then, when it is determined in the determination process that the value does not fall within the range, the following process is preferably performed. It is preferable to change an aspherical surface design in the aspherical surface designing process is changed after changing a base curve selected in the base curve selection process, and then, perform the determination process again. Alternatively, it is preferable to change an aspherical surface design in the aspherical surface designing process, and then, perform the determination process again. With this configuration, it is possible to reliably and extremely suitably provide the pair of spectacle lenses suitable for the binocular vision even when the response of accommodation differs between the left eye and the right eye.

However, to provide the base curve selection process, the aspherical surface designing process, and the determination process is merely a suitable example. In the base curve selection process, a base curve determined in advance may be used regardless of the prescription, instead of selecting the base curve according to the prescription. In the aspherical surface designing process, the aspherical surface design may be performed on a surface on the selected base curve side, performed on a surface that is not on the base curve side, or performed on both the surfaces. The determination process becomes unnecessary if it is known in advance that the above requirement of falling within the range of 80% to 120% is satisfied. Note that the base curve selection process, the aspherical surface designing process, and the determination process may be adopted in an appropriately combined manner instead of adopting all the processes or adopting none of the processes.

In addition, the process of acquiring the power errors ($PE_R$ and $PE_L$) in the respective spectacle lenses and acquiring the difference ΔPE therebetween has been expressed to be included in the determination process, but the process <S6> may be performed separately from the determination process. Although the difference in power error for near vision is calculated in FIG. 1, it is not inhibited to calculate a difference in power error when viewing a distance farther than the near vision (for example, intermediate vision or distance vision set by a spectacle lens).

Note that the information necessary for performing the designing process may be obtained in advance before the designing process. For example, a process <S1> of acquiring a prescription value (Sph, Cyl, Ax, or the like) of the wearer may be provided before the designing process. In addition, a process <S2> of acquiring a target distance for near vision when the wearer wears the spectacle lens may be provided.

In addition, a process <S3> of acquiring the responses of accommodation $AC_R$ and $AC_L$ of the respective eyes may be provided. The distance f for distance vision and the distance n for near vision at the time of obtaining the response of accommodation of each eye may be arbitrary. The distance n for near vision may be a target distance for the near vision set by a spectacle lens (for example, 40 cm). The distance f for distance vision is not particularly limited. The distance f for distance vision may be a distance of 1 m or more (for example, 5 m) or may be infinity. Then, a process of acquiring a difference between the responses of accommodation of the left and right eyes, that is, the difference $\Delta AC$ between $AC_R$ and $AC_L$ may be provided.

It is also possible to use a predetermined value as $\Delta AC$. Meanwhile, the response of accommodation $AC_R$ of the right eye and the response of accommodation $AC_L$ of the left eye of the wearer are preferably actually measured values obtained as results of performing measurement on the wearer to obtain $AC_R$ and $AC_L$. When actual AC of each eye of each wearer is used, the pair of spectacle lenses suitable for binocular vision can be provided for each wearer even if the response of accommodation differs between the left and right eyes.

The pair of spectacle lenses is, for example, a single-focus lens. In such a case, the power error provided in the designing process may be obtained from the aspherical surface design of the single-focus lens.

A technical idea of the present invention is reflected not only in the designing method of a pair of spectacle lenses but also in a producing method. For example, a main technical characteristic is the producing method of a pair of spectacle lenses including: a designing process of designing a pair of spectacle lenses using the designing method of a pair of spectacle lenses; and a producing process of producing the pair of spectacle lenses based on the content designed in the designing process. Note that it is sufficient to adopt a known method for the specific content of the producing process.

Similarly, the technical idea of the present invention is reflected on a pair of spectacle lenses. For example, a main technical characteristic is the pair of spectacle lenses including a right-eye spectacle lens and a left-eye spectacle lens, in which a difference $\Delta PE$ between a power error at a position T1 of a rotation angle $\alpha$ (15 degrees$\leq\alpha\leq$40 degrees) in a first spectacle lens and a power error at a position T2 of the rotation angle $\alpha$ in a second spectacle lens is 0.15 D or more. However, it is generally preferable that the power error itself be small. Therefore, the value $\Delta PE$ is set to preferably 0.50 D or less, and more preferably 0.25 D or less.

In such a case, it is preferable that a power error at the position T2 in the first spectacle lens be within ±0.10 D and a power error at the position T1 in the second spectacle lens be 0.15 D or more. The power error at the position T1 is set to preferably 0.50 D or less, and more preferably 0.25 D or less.

Note that a technical scope of the present invention is not limited to the aforedescribed embodiment but may include various modifications or improvements as long as the specific effects obtained by the elements of the present invention or a combination thereof can be derived. For example, the surface for the aspherical surface design in the spectacle lens may be an object-side surface, an eyeball-side surface, or both the surfaces. Finally, there is no particular limitation as long as the power error, which compensates for the difference between the response of accommodation of the right eye and the response of accommodation of the left eye of the wearer is provided in the pair of spectacle lenses and it is possible to provide the pair of spectacle lenses suitable for binocular vision.

EXAMPLES

Next, examples will be given to specifically describe the present invention. Of course, the present invention is not limited to the following examples. Note that the following examples are performed according to the flowchart of FIG. 1. Note that an object-side surface was designed as a spherical surface, and an eyeball-side surface was designed as an aspherical surface in the respective examples.

Example 1

(Single-Focus Minus Lens)

First, a value of Sph −3.00 D was obtained as a prescription value for a wearer (No. 1) of a pair of spectacle lenses which are single-focus lenses. Next, a value of 400 mm (40 cm) was acquired as a target distance (that is, the target distance for near vision) of the pair of spectacle lenses for the wearer.

In addition to the above acquisition process, $AC_R$ and $AC_L$ were measured for the wearer in the present example. A response of accommodation $AC_R$ of a right eye and a response of accommodation $AC_L$ of a left eye were acquired, and a difference $\Delta AC$ between the responses of accommodation of the left and right eyes was acquired.

Various conditions and results at that time are as follows.

Distance f (distance vision): 5 m

Distance n (near vision): 40 cm

Stimulus of accommodation: 2.30 D (=1/0.4−1/5)

Response of accommodation $AC_R$ of right eye: 2.10 D

Response of accommodation $AC_L$ of left eye: 1.72 D

Difference $\Delta AC$ between responses of accommodation of left and right eyes: 0.38 D Hereinafter, a designing process is performed. In the present example, the design was performed such that a refractive index of a lens substrate is 1.662 and a center thickness is 1.1 mm. In addition, the rotation angle $\alpha$ for viewing a near position was set to 20 degrees.

In the present example, 1 curve (BC 1.0) was set as the base curve based on the above-described spectacle prescription.

Next, an aspherical surface design was performed. Specifically, first, the aspherical surface design was performed on a right-eye spectacle lens with the response of accommodation larger than that of the left eye such that the power error was almost zero (hereinafter referred to as power error-oriented). Results thereof are illustrated in FIG. 2.

Figure 2:
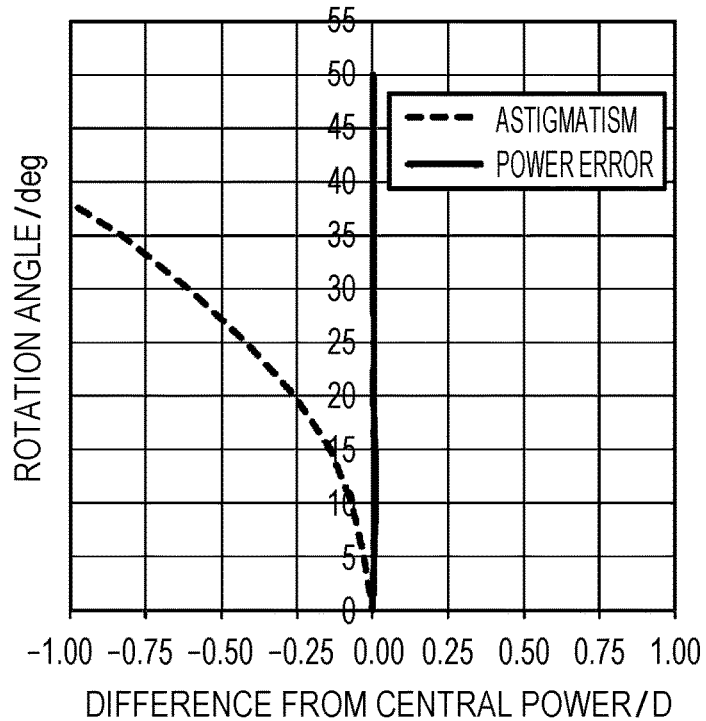
FIG. 2 is a graph showing a power error and an astigmatism in a right-eye spectacle lens in Example 1, in which the horizontal axis represents D (1 scale is 0.25 D) and the vertical axis represents a rotation angle (1 scale is 5 degrees).

FIG. 2 is a graph showing a power error and an astigmatism in the right-eye spectacle lens in Example 1, in which the horizontal axis represents D (1 scale is 0.25 D) and the vertical axis represents a rotation angle (1 scale is 5 degrees). Note that the astigmatism tends to increase when trying to make the power error substantially zero. Conversely, the power error tends to increase when trying to make the astigmatism substantially zero.

At the position T1 of the right-eye spectacle lens when the eye rotation angle was 20 degrees, the power error $PE_L$ became 0.

Then, the aspherical surface design was performed on a left-eye spectacle lens such that an astigmatism was substantially zero (hereinafter, referred to as astigmatism-oriented). Results thereof are illustrated in FIG. 3.

Figure 3:
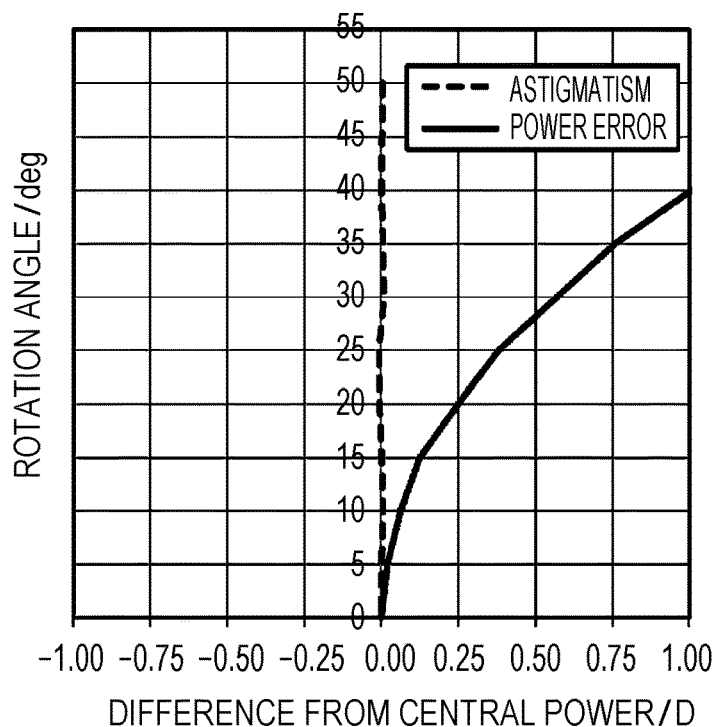
FIG. 3 is a graph showing a power error and an astigmatism in a left-eye spectacle lens in Example 1, in which the horizontal axis represents D (one scale is 0.25 D) and the vertical axis represents a rotation angle (one scale is 5 degrees).

FIG. 3 is a graph showing a power error and an astigmatism in the left-eye spectacle lens in Example 1, in which the horizontal axis represents D (one scale is 0.25 D) and the vertical axis represents a rotation angle (one scale is 5 degrees).

At the position T2 of the left-eye spectacle lens when the eye rotation angle was 20 degrees, the power error $PE_L$ became 0.25 D.

The difference $\Delta PE$ (=$PE_L$−$PE_R$=0.25 D) between the power error $PE_R$ of the right-eye spectacle lens and the power error $PE_L$ of the left-eye spectacle lens was acquired.

Then, a value of ΔPE=0.25 D with respect to the difference ΔAC=0.38 D between the responses of accommodation of the left and right eyes fell within a suitable tolerance (within ±0.15 D). As a result, it was determined that the difference ΔAC between the responses of accommodation of the left eye and the right eye of the wearer had been compensated for with the difference ΔPE between the power error $PE_L$ of the left-eye spectacle lens and the power error $PE_R$ of the right-eye spectacle lens through the above-described aspherical surface design, and the design was completed.

Example 2

(Single-Focus Plus Lens)

First, a value of Sph +2.00 D was obtained as a prescription value for a wearer (No. 2) of a pair of spectacle lenses which are single-focus lenses. Next, a value of 400 mm (40 cm) was acquired as a target distance (that is, the target distance for near vision) of the pair of spectacle lenses for the wearer.

In addition to the above acquisition process, $AC_R$ and $AC_L$ were measured for the wearer in the present example. A response of accommodation $AC_R$ of a right eye and a response of accommodation $AC_L$ of a left eye were acquired, and a difference ΔAC between the responses of accommodation of the left and right eyes was acquired.

Various conditions and results at that time are as follows.
Distance f (distance vision): 5 m
Distance n (near vision): 40 cm
Stimulus of accommodation: 2.30 D (=0/0.4−1/5)
Response of accommodation $AC_R$ of right eye: 2.02 D
Response of accommodation $AC_L$ of left eye: 1.76 D
Difference ΔAC between responses of accommodation of left and right eyes: 0.26 D Hereinafter, a designing process is performed. In the present example, the design was performed such that a refractive index of a lens substrate is 1.662 and a center thickness is 6.0 mm. In addition, the rotation angle α for viewing a near position was set to 30 degrees.

In the present example, 6 curve (BC 6.0) was set as the base curve based on the above-described spectacle prescription.

Next, an aspherical surface design was performed. Specifically, first, the aspherical surface design was performed on a right-eye spectacle lens with the response of accommodation larger than that of the left eye such that the power error was almost zero (hereinafter referred to as power error-oriented). Results thereof are illustrated in FIG. 4.

Figure 4:
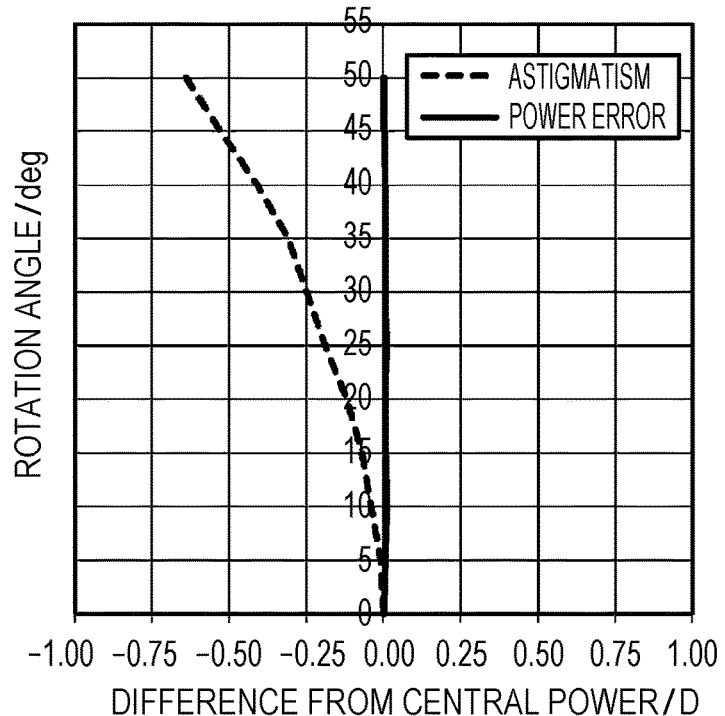
FIG. 4 is a graph showing a power error and an astigmatism in a right-eye spectacle lens in Example 2, in which the horizontal axis represents D (one scale is 0.25 D) and the vertical axis represents a rotation angle (one scale is 5 degrees).

FIG. 4 is a graph showing a power error and an astigmatism in the right-eye spectacle lens in Example 2, in which the horizontal axis represents D (1 scale is 0.25 D) and the vertical axis represents a rotation angle (1 scale is 5 degrees). Note that the astigmatism tends to increase when trying to make the power error substantially zero. Conversely, the power error tends to increase when trying to make the astigmatism substantially zero.

At the position T1 of the right-eye spectacle lens when the eye rotation angle was 30 degrees, the power error $PE_L$ became 0.

Then, the aspherical surface design was performed on a left-eye spectacle lens such that an astigmatism was substantially zero (hereinafter, referred to as astigmatism-oriented). Results thereof are illustrated in FIG. 5.

Figure 5:
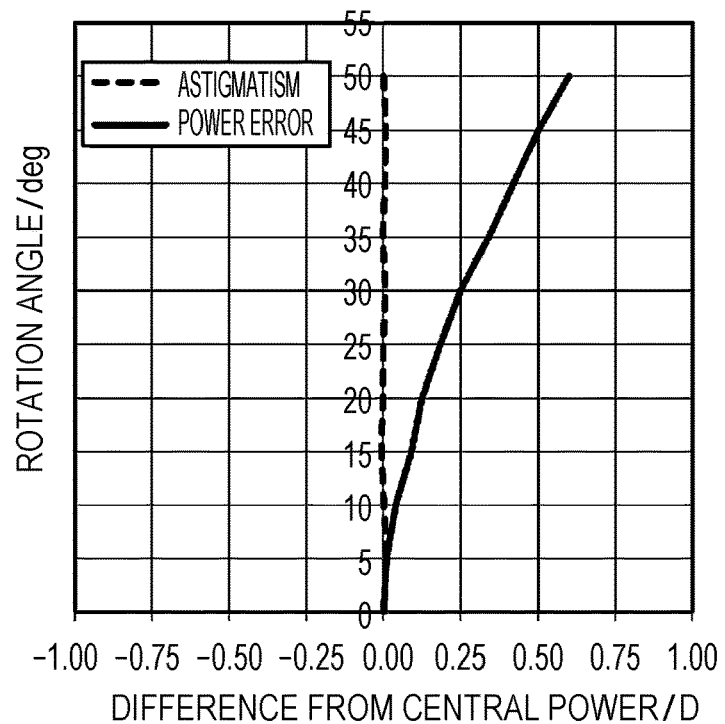
FIG. 5 is a graph showing a power error and an astigmatism in a left-eye spectacle lens in Example 2, in which the horizontal axis represents D (one scale is 0.25 D) and the vertical axis represents a rotation angle (one scale is 5 degrees).

FIG. 5 is a graph showing a power error and an astigmatism in the left-eye spectacle lens in Example 2, in which the horizontal axis represents D (one scale is 0.25 D) and the vertical axis represents a rotation angle (one scale is 5 degrees).

At the position T2 of the left-eye spectacle lens when the eye rotation angle was 30 degrees, the power error $PE_L$ became 0.25 D.

The difference ΔP ($=PE_L-PE_R$=0.25 D) between the power error $PE_R$ of the right-eye spectacle lens and the power error $PE_L$ of the left-eye spectacle lens was acquired.

Then, a value of ΔPE=0.25 D with respect to the difference ΔAC=0.26 D between the responses of accommodation of the left and right eyes fell within a suitable tolerance (within ±0.15 D). As a result, it was determined that the difference ΔAC between the responses of accommodation of the left eye and the right eye of the wearer had been compensated for with the difference ΔPE between the power error $PE_L$ of the left-eye spectacle lens and the power error $PE_R$ of the right-eye spectacle lens through the above-described aspherical surface design, and the design was completed.

Example 3

(Progressive Addition Lens)

First, a value of Sph 0.00 D was obtained as a prescription value for a wearer (No. 3) of a pair of spectacle lenses which are progressive addition lenses (progressive multifocal lens). In addition, a value of 1.00 D was obtained as an increment from a power at a distance power measurement position to a power at a near power measurement position, that is, an addition power.

A response of accommodation $AC_R$ of a right eye and a response of accommodation $AC_L$ of a left eye were acquired, and a difference ΔAC between the responses of accommodation of the left and right eyes was acquired separately from the above-described acquisition process. In the present example, $AC_R$ and $AC_L$ were measured for the wearer. Various conditions at that time were the same as those in Example 1. The wearer (No. 3) of the present example had the larger response of accommodation in the right eye. The difference ΔAC ($=AC_R-AC_L$) between the responses of accommodation of the left and right eyes was 0.19 D.

Hereinafter, a designing process is performed. In the present example, the design was performed such that a refractive index of a lens substrate is 1.662 and a center thickness is 1.1 mm.

In the present example, 1 curve (BC 1.0) was set as the base curve based on the above-described spectacle prescription.

Next, an aspherical surface design was performed. In the present embodiment, a progressive design corresponds to an aspherical surface design.

Note that the distance power measurement position on the principal meridian was set to a position (X=0, Y=8.0 mm) when a geometric center of a lens was set as the origin. A rotation angle of the wearer at this time is 0 degrees.

In addition, the near power measurement position on the principal meridian was set to a position (X=0, Y=−15 mm) when the geometric center of the lens was set as the origin. A rotation angle of the wearer at this time is about 30 degrees.

Specifically, first, an addition power of 1.00 D was added to the right-eye spectacle lens which had the larger response of accommodation than the left eye. As a result, the power set at the distance power measurement position was 0.00 D, and the power set at the near power measurement position was +1.00 D. A result thereof is illustrated in FIG. 6.

FIG. 6 is a graph showing a power change in a right-eye spectacle lens (broken line) and a left-eye spectacle lens (solid line) in Example 3, in which the horizontal axis represents D (1 scale is 0.25 D), and the vertical axis represents a Y coordinate on the principal meridian (1 scale is 5 mm).

Then, an additional power of 1.15 D was added to the left-eye spectacle lens in order to compensate for the difference ΔAC between the responses of accommodation of the left and right eyes. As a result, the power set at the distance power measurement position was 0.00 D, and the power set at the near power measurement position was +1.15 D. A result thereof is also illustrated in FIG. 6.

A difference ΔP (=1.15 D−1.00 D=0.15 D) at the near power measurement position between a power difference $P_R$ of the right-eye spectacle lens (that is, an addition power, +1.00 D−0.00 D in the present example) and a power difference $P_L$ of the left-eye spectacle lens (that is, an addition power, +1.15 D−0.00 D in the present example) was obtained.

Then, a value of ΔP=0.15 D with respect to the difference ΔAC=0.19 D between the responses of accommodation of the left and right eyes fell within a suitable tolerance (within ±0.15 D). As a result, it was determined that the difference ΔAC between the responses of accommodation of the left eye and the right eye of the wearer had been compensated for with the difference ΔP between the power difference $P_L$ of the left-eye spectacle lens and the power difference $P_R$ of the right-eye spectacle lens through the above-described aspherical surface design (that is, the progressive design), and the design was completed.

In the present specification, the "power difference" encompasses not only the power error of the single-focus lens illustrated in Examples 1 and 2 but also the power change obtained by setting the addition power of the progressive addition lens illustrated in Example 3. When applying the technical idea of the present invention to a progressive addition lens, the position T1 and the position T2 may be set as near power measurement positions, and the "power error" may be rephrased as the "power change (value obtained by subtracting the power at the distance power measurement position from the power at the near power measurement position)".

For example, a larger power change may be set to a spectacle lens for an eye with a smaller response of accommodation between the response of accommodation of the right eye and the response of accommodation of the left eye as compared to a spectacle lens for an eye with a larger response of accommodation as in Example 3. Note that the power change is the power difference set separately from a prescription value such as an addition power prescribed for the wearer. The power error in the single-focus lens illustrated in the present embodiment is also the power difference set separately from the prescription value.

The invention claimed is:

1. A designing method of a pair of spectacle lenses including a right-eye spectacle lens and a left-eye spectacle lens, the designing method comprising:
designing the pair of spectacle lenses so as to provide a power difference that compensates for a difference between a response of accommodation of a right eye of a wearer and a response of accommodation of a left eye of the wearer,
wherein a response of accommodation of each eye of the wearer is a numerical difference between an applied accommodation of the eye of the wearer exhibited when the wearer views an object at a first distance and an applied accommodation of the eye of the wearer exhibited when viewing an object at a second distance that is shorter than the first distance; and
setting a numerical difference between a power error at a position of a predetermined rotation angle on the right-eye spectacle lens and a power error at a position of the predetermined rotation angle on the left-eye spectacle lens, based on the numerical difference between the response of accommodation of the right eye and the response of accommodation of the left eye of the wearer, wherein
a value, obtained by subtracting a power error at a second position having a rotation angle in a spectacle lens for an eye with a larger response of accommodation from a power error at a first position of the rotation angle in a spectacle lens for an eye with a smaller response of accommodation, is set to be 0.15 D or more, the rotation angle being defined by a in a range of which 15 degrees≤α≤40 degrees.

2. The designing method of a pair of spectacle lenses according to claim 1, wherein
each lens of the pair of spectacle lenses has a plurality of powers, and
a spectacle lens for the eye having a smaller response of accommodation is provided with a larger power difference than a spectacle lens for the eye having a larger response of accommodation, the power difference being other than a prescription value.

3. The designing method of a pair of spectacle lenses according to claim 1, further comprising:
setting the difference between the power error at the position of the predetermined rotation angle on the right-eye spectacle lens and the power error at the position of the predetermined rotation angle on the left-eye spectacle lens to be approximate to the difference between the response of accommodation of the right eye and the response of accommodation of the left eye of the wearer.

4. The designing method of a pair of spectacle lenses according to claim 1, wherein
a first difference between the power error of the right-eye spectacle lens and the power error of the left-eye spectacle lens is 80% to 120% of a second difference between the response of accommodation of the right eye and the response of accommodation of the left eye, the first difference being greater than 0, and the second difference being greater than 0.

5. The designing method of a pair of spectacle lenses according to claim 4, wherein
the first difference between the power error of the right-eye spectacle lens and the power error of the left-eye spectacle lens is within ±0.25 D with respect to the second difference between the response of accommodation of the right eye and the response of accommodation of the left eye.

6. The designing method of a pair of spectacle lenses according to claim 1, wherein
the power error at the second position in the spectacle lens for the eye with the larger response of accommodation is set within ±0.10 D, and the power error at the first position in the spectacle lens for the eye with the smaller response of accommodation is set to be 0.15 D or more.

7. The designing method of a pair of spectacle lenses according to claim 1, wherein
the response of accommodation of the right eye and the response of accommodation of the left eye of the wearer are actually measured values obtained as results of performing a measurement on each eye of the wearer to obtain the difference between the applied accommodation of the eye of the wearer exhibited when the wearer views the object at a first distance and the applied accommodation of the eye of the wearer exhibited when viewing the object at a second distance.

8. A designing method of a pair of spectacle lenses including a right-eye spectacle lens and a left-eye spectacle lens, the designing method comprising:

designing the pair of spectacle lenses so as to provide a power difference that compensates for a difference between a response of accommodation of a right eye of a wearer and a response of accommodation of a left eye of the wearer, wherein a response of accommodation of each eye of the wearer is a numerical difference between an applied accommodation of the eye of the wearer exhibited when the wearer views an object at a first distance and an applied accommodation of the eye of the wearer exhibited when viewing an object at a second distance that is shorter than the first distance;

setting a numerical difference between a power error at a position of a predetermined rotation angle on the right-eye spectacle lens and a power error at a position of the predetermined rotation angle on the left-eye spectacle lens, based on the numerical difference between the response of accommodation of the right eye and the response of accommodation of the left eye of the wearer;

selecting, in a base curve selection process, a base curve according to a prescription in the spectacle lenses for the respective eyes;

performing, in an aspherical surface designing process, aspherical surface design on a surface on a side of the selected base curve; and determining, in a determination process, whether or not a value, obtained by subtracting the power error at a second position of a rotation angle of a spectacle lens for the eye with larger response of accommodation from the power error at a first position of a rotation angle of a spectacle lens for the eye with a smaller response of accommodation between the response of accommodation of the right eye and the response of accommodation of the left eye of the wearer, falls within a range of 80% to 120% of a difference between the response of accommodation of the right eye and the response of accommodation of the left eye, in a design of the pair of spectacle lenses obtained based on the aspherical surface designing process, the difference being greater than 0, and the rotation angle being defined by a in a range of which 15 degrees≤α≤40 degrees, when it is determined that the value is not within the range, the determination process is performed again after changing a base curve selected in the base curve selection process and then changing an aspherical surface design, or after changing an aspherical surface design, and when it is determined in the determination process that the value is within the range, the determination process is complete.

9. A producing method of a pair of spectacle lenses including a right-eye spectacle lens and a left-eye spectacle lens, the producing method comprising:

designing the pair of spectacle lenses using the designing method of a pair of spectacle lenses according to claim 1; and producing the pair of spectacle lenses based on a content designed in the designing of the pair of spectacle lenses.

* * * * *